May 31, 1955  H. BENEKE, JR  2,709,280
METHOD FOR PRODUCING MOLDED ARTICLES
Filed Dec. 8, 1953  4 Sheets-Sheet 2
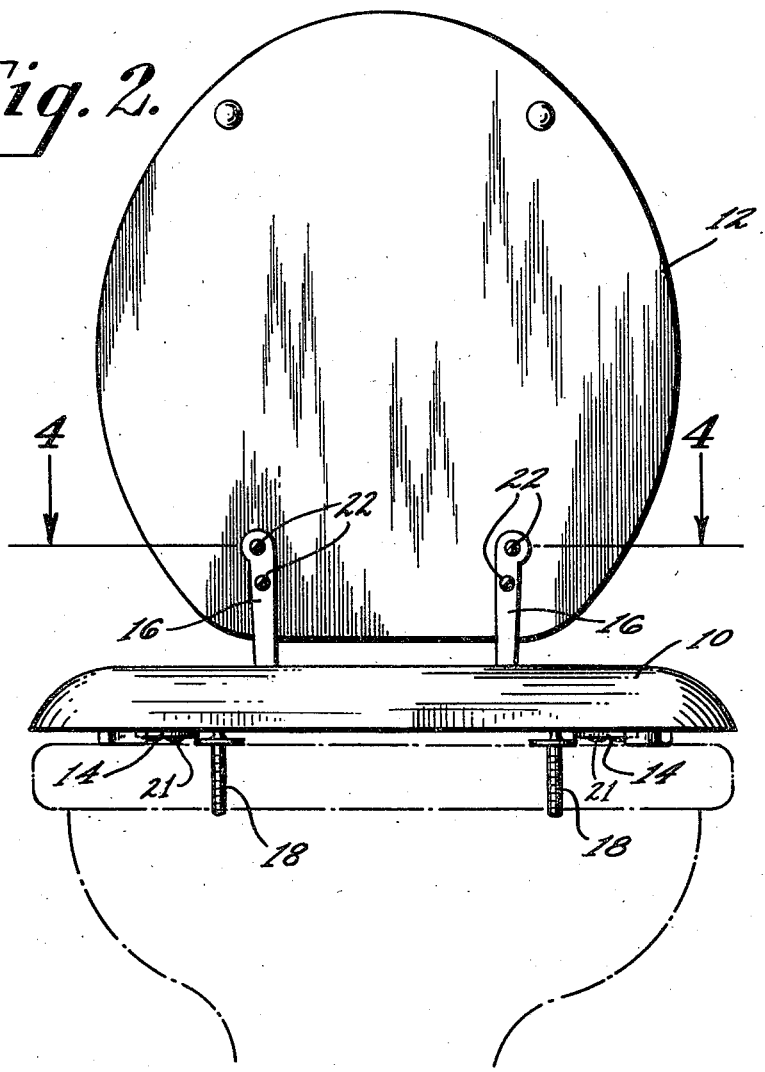
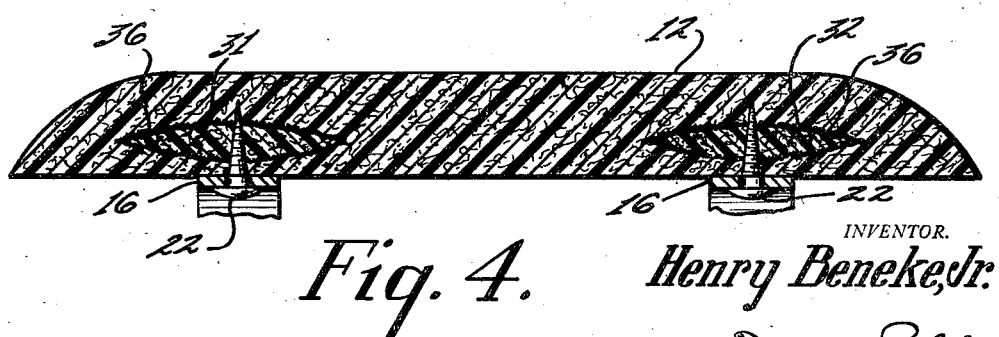
INVENTOR.
Henry Beneke, Jr.
BY
ATTORNEY

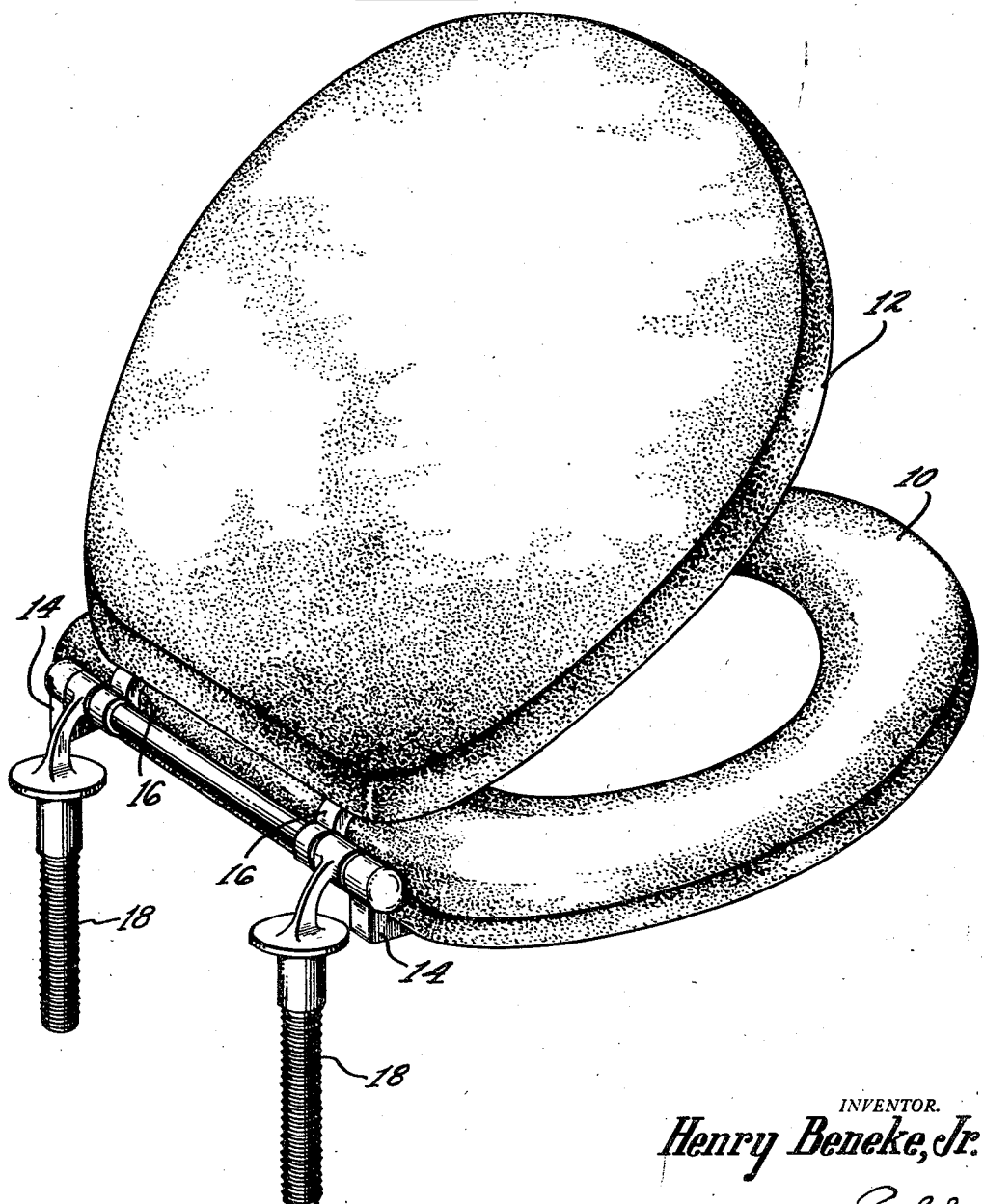

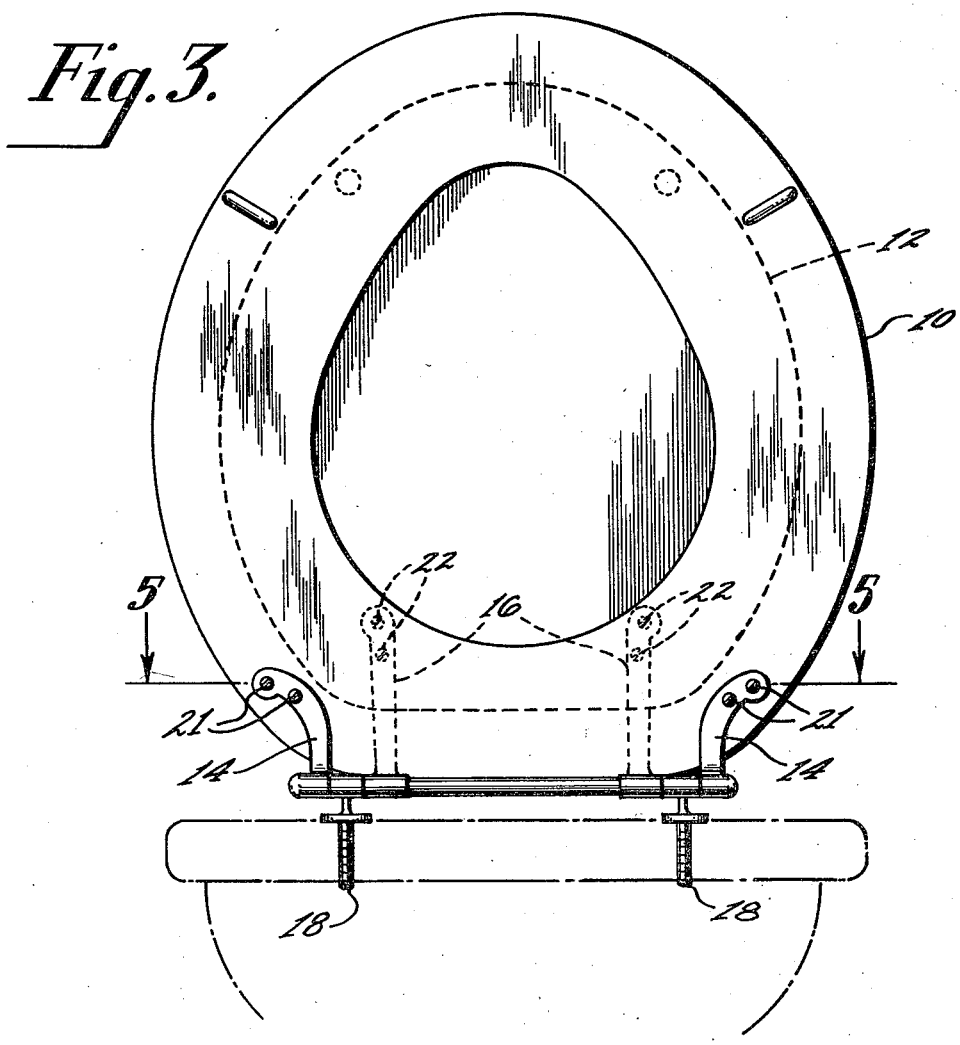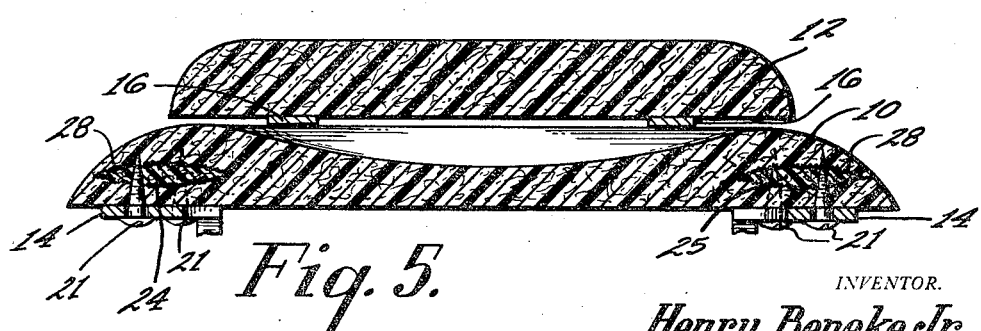

May 31, 1955  H. BENEKE, JR  2,709,280
METHOD FOR PRODUCING MOLDED ARTICLES
Filed Dec. 8, 1953  4 Sheets-Sheet 4
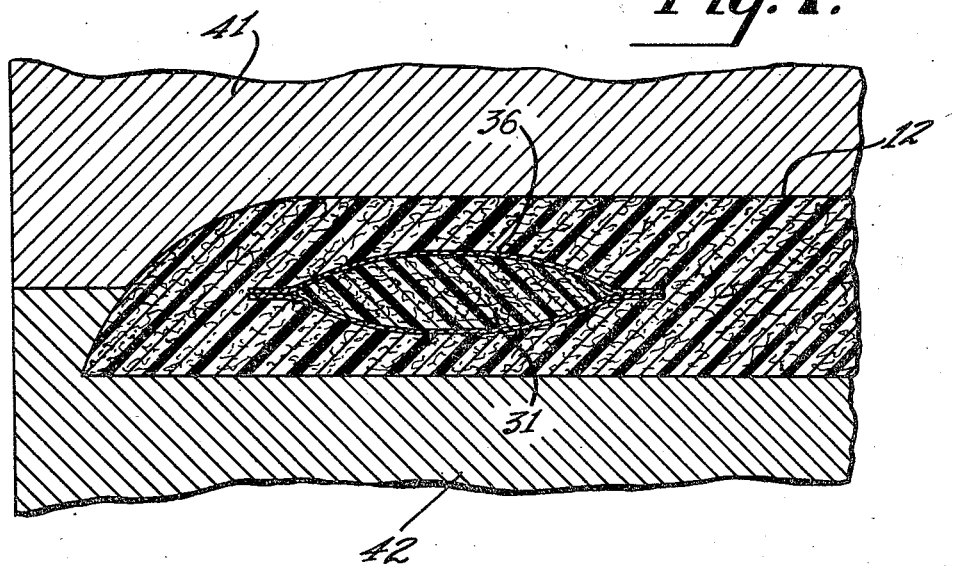
INVENTOR.
Henry Beneke, Jr.
BY
ATTORNEY

United States Patent Office 2,709,280
Patented May 31, 1955

2,709,280

METHOD FOR PRODUCING MOLDED ARTICLES

Henry Beneke, Jr., Columbus, Miss., assignor to Beneke Corporation, Columbus, Miss., a corporation of Mississippi Application December 8, 1953, Serial No. 396,891

4 Claims. (Cl. 18—59)

The present invention relates to method for producing molded articles, such, for example, as a toilet seat or cover and methods of producing the novel article.

The present invention provides, in a novel way, an article having a unitary portion differing in physical characteristics from the remainder of the article. An article, such as a toilet seat, requires that hardware be secured to it. Reinforcement is needed in the toilet seat to hold fastening screws. Modern seats of better quality are molded and in prior art inserts have been provided to receive screws. These prior art inserts, although they are embedded, are not, in effect integral with the structure. In accordance with the present invention, an integral portion of the structure is provided in a novel manner which serves as a reinforcing insert.

An object of the invention is to provide a method for producing a molded article having an internal integral portion of a different character from the remainder of the article.

Another object of the invention is to provide a method for producing a molded article having a portion of a different composition from the remainder.

A further object of the invention is to provide a method for producing an article having an internal portion surrounded by a material compatible with the material of the article.

Still another object of the invention is to provide a novel molding method for producnig an integral insert in an article.

A still further object is to provide a novel step in a molding process involving the containment of material for an insert.

Still another object of the invention is to provide a novel molding method wherein a structure is provided having an internal zone of a different composition than the remaining structure.

Other and perhaps more specific objects will become apparent as the following description proceeds in connection with the accompanying drawing in which:

Fig. 1 is a view in perspective of a toilet seat and cover to which the invention may be applied;

Fig. 2 is a view of the underside of the cover with the cover lifted;

Fig. 3 is a view of the underside of the seat with the seat also lifted;

Fig. 4 is a section of the lid on line 4—4 of Fig. 2;

Fig. 5 is a section of the seat on line 5—5 of Fig. 3;

Fig. 6 is a perspective view of contained material in preparation for production of an insert; and Fig. 7 is a fragmentary view in section of a mold to illustrate molding of an article following procedures taught in the present invention.

Fig. 1 of the drawing shows a toilet seat 10 and a cover 12 of a type which may be molded to embody the invention. Hardware comprising seat hinge connections 14 and lid hinge connections 16 are provided. The hardware includes a fitting 18 for connection to a toilet bowl (not shown). The seat hinge connections or irons 14 are secured to the seat 10 by means of screws 21 which are turned into the seat structure. The cover hinge connections 16 are secured to the cover 12 by means of screws 22. These screw connections require extra strength in the body of the material to prevent loosening of the screws and consequent enlargement of the screw holes. Inserts have been used, but these are difficult to mold in and add to the cost. Moreover, the presence of an insert tends to weaken the structure since cross sectional areas of the molded structure are reduced at points of applied stress. By practicing the present invention, all of the benefits of inserts are realized without any of the disadvantages. The total cross section of the molded structure is available to resist stress and its mechanical resistance is enhanced. There is no possibility of an insert working loose.

Referring to Fig. 5 of the drawing, the seat 10 is shown in cross section. Fig. 4 is a similar view for the cover 12. As both views indicate internal structure, Fig. 5 will be described more in detail. The seat body 10 is composed of molded material. Reference characters 24 and 25 indicate sectional areas of internal parts, inserts, or "members" which are, in effect, integral, in accordance with the invention, with the seat body. The main body of the seat 10 surrounding the parts 24 and 25 is composed, in this example, of a moldable material such as sawdust or wood flour and phenolic resin. Other resins may be used. Thermoplastic resins are also available. Fifteen percent of powdered resin by weight is suitable.

In Fig. 6 is shown a paper bag 28 similar to the usual tea bag. The type of paper used in the bag is known as 8 lb. to 12 lb. tea bag heat sealed paper. It is extremely porous which is an advantage. This bag is filled with a mixture similar to that described above for the body of the seat 10. There is, however, a high concentrate of resin. The resin powder may be 25 to 40 percent. The bag is heat sealed to retain the high concentrate mix. The bag and its contents provide the parts 24 and 25.

The cover 12 in Fig. 4 has an internal appearance similar to that of the seat 10. Areas 31 and 32 of the cover 12 represent molded in members which are enclosed, initially, by bags 36. These bags are, or may be, identical with the bags 28.

Fig. 7 indicates generally the manner of molding an article in accordance with the invention and will be referred to solely for the purpose of describing process steps to be followed. It will be understood that any molding and/or heating apparatus may be used and that the invention is not restricted by apparatus limitations.

The mold is shown as being composed of two parts 41 and 42 having suitable mold cavities therein. These parts are separable so as to be loaded with moldable material. Any heating means (not shown) may be provided. To produce either the seat 10 or the cover 12 a mixture of wood flour is made with a relatively large amount of resin. This high resin concentrate mixture is placed in the paper bag 28 (or the bag 36). The bag is then sealed by heat. The mold is loaded in accordance with any known mold loading technique with the normal mix or composition for the body of the part to be molded. As the mold is being loaded with the regular mix, one or more of the sealed and filled bags 28 or 36 are placed in the exact place where reinforcement is needed. Before the mold is closed the bag or bags are covered with a thin layer of the regular mix and thus in effect bury the bag in the material to be molded. The mold is closed and heat and pressure are applied for the needed amount of time to complete the curing cycle. The curing cycle for the article is substantially unchanged by inclusion of the bag. The high concentrate resin mix in the bag cures along with the material surrounding it and inasmuch as the bag is not only porous but is made of a material compatible with the regular mix the entire mass becomes homogeneous so that when the seat, or other article, is removed from the mold a product is obtained which has embedded in it a portion of high concentration resin which gives added strength and large screw holding power.

What is claimed is:

1. The method of forming a molded article having an embedded integral portion of higher strength than the main body of the article; comprising the steps of preparing a moldable mix having a plastic component for the body of the article, preparing a mix having a greater concentration of said plastic component, enclosing said high concentrate mix in a container compatible with the material for the body of the article, and molding said article with the container embedded therein.

2. The method of forming a molded article having an embedded integral portion of higher strength than the main body of the article; comprising the steps of preparing a moldable mix of a blend of wood flour and a phenolic resin, preparing a mix having a greater concentration of phenolic resin, enclosing said high concentrate mix in a container compatible with the material for the body of the article, and molding said article with the container embedded therein.

3. The method of forming a molded article having an embedded integral portion of higher strength than the main body of the article; comprising the steps of preparing a moldable mix of a blend of wood flour and a thermosetting resin, preparing a mix having a greater concentration of said thermosetting resin, enclosing said high concentrate mix in a container compatible with the material for the body of the article, and molding said article with the container embedded therein.

4. The method of forming a molded article having an embedded integral portion of higher strength than the main body of the article; comprising the steps of preparing a moldable mix of a blend of wood flour and a thermoplastic material, preparing a mix having a greater concentration of said thermoplastic material, enclosing said high concentrate mix in a container compatible with the material for the body of the article, and molding said article with the container embedded therein.

References Cited in the file of this patent

UNITED STATES PATENTS

| | | | |
|---|---|---|---|
| 807,437 | Burt | Dec. 19, | 1905 |
| 1,264,219 | Steurer | Apr. 30, | 1918 |
| 1,309,757 | Kempton | July 15, | 1919 |
| 1,333,526 | Wright | Mar. 9, | 1920 |
| 1,392,174 | Kempton | Sept. 27, | 1921 |
| 1,959,375 | Loetscher | May 22, | 1934 |
| 2,021,425 | Nielsen | Nov. 19, | 1935 |
| 2,067,012 | Loetscher | Jan. 5, | 1937 |
| 2,137,986 | Sanford | Nov. 22, | 1938 |
| 2,156,754 | Evans et al. | May 2, | 1939 |
| 2,385,460 | Omansky | Sept. 25, | 1945 |
| 2,397,936 | Glidden et al. | Apr. 9, | 1946 |
| 2,632,211 | Trigg | Mar. 24, | 1953 |
| 2,673,372 | Karnoil | Mar. 30, | 1954 |